Aug. 22, 1939.  M. C. ALLEN ET AL  2,170,181

ELASTIC PIPE JOINT

Filed June 11, 1937

Inventors
Morris C. Allen
Ray G. Shelley
by Parker Hunter
Attorneys.

Patented Aug. 22, 1939

2,170,181

UNITED STATES PATENT OFFICE 2,170,181

ELASTIC PIPE JOINT

Morris C. Allen, Mercedes, and Ray G. Shelley, Donna, Tex.

Application June 11, 1937, Serial No. 147,614

1 Claim. (Cl. 285—90)

Our invention relates to an improvement in flexible joints and in expansion and contraction joints for pipes, and in methods of forming them.

One purpose is the provision of an improved flexible and elastic joint wherein a substantially water tight joint is provided which permits a relative flexure of adjacent pipe sections, or a variation in the distance between adjacent pipe sections, without causing the joint to leak.

Another purpose is the provision of improved means for preventing leakage caused by shifting and settling of pipe lines or by relatively slight displacement of adjacent pipe sections.

Another purpose is the provision of a joint which shall have the two-fold function of bonding two adjacent members together in water tight relationship while permitting a substantial relative movement or displacement thereof.

Another purpose is the provision of improved means for mending or repairing cracks in pipe sections or leaking pipe joints.

Another purpose is the provision of improved means for preventing cracking or breaking of pipe lines caused by shifting or displacement of pipes and pipe sections due to changes in temperature or other causes.

Another purpose is the provision of improved means for absorbing the longitudinal expansion and contraction of pipe sections when laid end to end to form a pipe line, which expansion and contraction, due to changes in temperature, causes the pipe sections to break or crack, with resulting leaks, if not absorbed by elastic or flexible joints.

Other purposes will appear from time to time in the course of the specification and claim.

We illustrate our invention more or less diagrammatically in the accompanying drawing wherein.

Like parts are indicated by like symbols throughout the specification and drawing.

Figure 1:
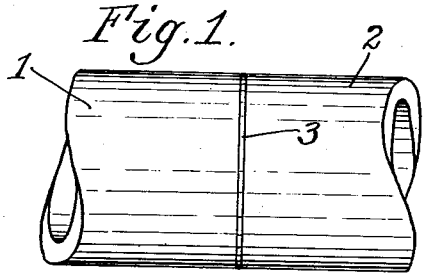
Figure 1 is an outside elevation illustrating the pipe joint.

Referring to the drawing, 1 indicates an end of a pipe section or member and 2 the adjacent end of an opposed pipe member. 3 illustrates a seal of a rubber composition which may for example be treated latex, caoutchouc, or its equivalent, or any suitable cement which maintains itself as a flexible and elastic but adhesive mass.

Figure 2:
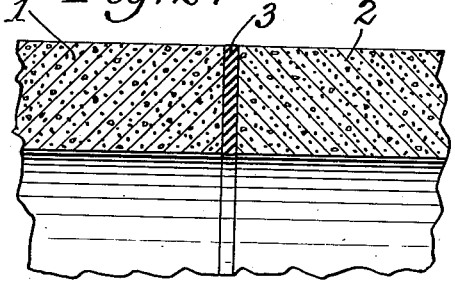
Figure 2 is a longitudinal radial section illustrating the manner of joining two sections of plain or square end concrete pipe.
Figure 6:
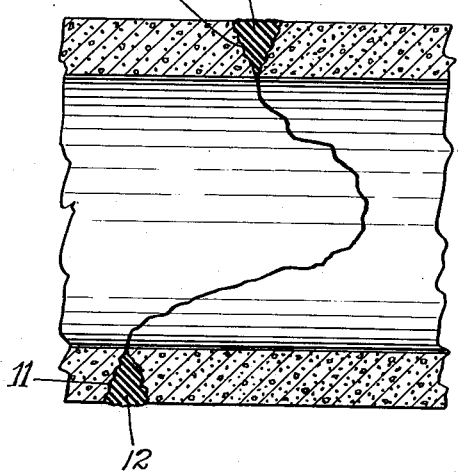
Figure 6 illustrates the employment of our invention in the repair of a transverse crack through a pipe.

In the construction of our joint any suitable means may be employed for forming a space into which the cement may be poured. We may for example employ forms within and without the pipes. Two pipe sections may be placed adjacent each other in the relative positions shown in Figure 2 and the space between the abutting or closely approaching pipe surfaces and the forms then filled with the cement. The cement penetrates the pores or interstices of the surface of the pipe and is then permitted to harden. It adheres closely to the opposed pipe surfaces so closely as to provide a substantially liquid tight joint.

Another method of constructing our joint is first to "prime" the surfaces of the two pipes which are to be joined. This is done by applying latex or other suitable elastic cement mixed to a consistency of heavy paint with a paint brush and then pressing the cement into the pores or interstices of the pipe with the fingers.

Next a quantity of latex or other suitable elastic cement, mixed to a thick viscous consistency is applied to the primed surfaces with a trowel. The opposed ends of the two sections of pipe are then brought into proximity with each other, care being taken to leave a space of from one-eighth to one-quarter inch between them. The length of this space is varied according to conditions.

When this is done the cement previously placed on one pipe section comes into intimate contact with that placed on the other, and a portion of it is squeezed out of the space between the opposed ends of the pipes, both inside and outside the pipes. This excess cement is removed with a trowel, leaving the surface of the joint and the surfaces of the pipes flush both inside and out.

The distance between the opposed pipes is preferably sufficiently great to provide room for a substantial mass of rubber cement or elastic material. When the cement has hardened, the adjacent pipe sections may be somewhat moved in relation to each other without breaking the bond or seal between the cement mass and the opposed pipe surfaces.

Figure 3:
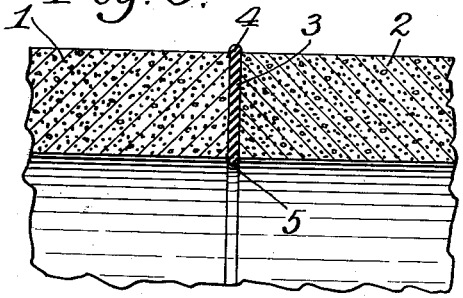
Figure 3 is a similar view showing the bulged out surface of the joint when the pipe is expanded due to rise in temperature.
Figure 4:
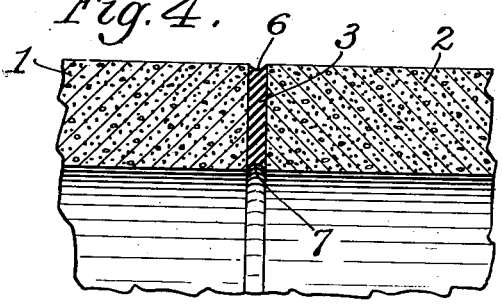
Figure 4 is a similar section showing the depressed surface of the joint when the pipe is contracted due to a fall in temperature.

Furthermore, changes in temperature which cause the pipe to increase in length when heated and to decrease in length when subjected to colder temperatures do not affect the joint. When the ends of the adjacent pipe sections approach each other, whether due to expansion of the pipe resulting from heat or to longitudinal pressure on the pipe line, the material 3 simply bulges out as at 4 and 5, as shown in Figure 3. When the pipe contracts or when adjacent sections are somewhat drawn apart, the body of flexible and elastic cement is elongated by the tension and the edges suck in more or less to form an annular depression as shown at 6 and 7 in Figure 4.

Figure 5:
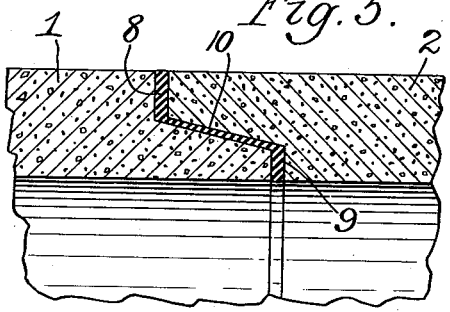
Figure 5 is a similar view through a variant form of joint in which adjacent sections of so-called bell and spigot pipe are joined.

Our method and joint work very well on the so-called plain or square ended pipes. They work equally well, however, in the bell and spigot type of pipe as shown in Figure 5. The only difference is that instead of having an opposed square joint the joint includes portions 8 and 9 which may be generally parallel with each other and are connected by an inclined intermediate portion 10.

In repairing pipe, for example where a section has broken intermediate its ends, or where an old joint made with cement mortar has cracked and is leaky, we may cut away a circumferential channel as at 11 and fill it with a mass of cement 12. It makes a thorough bond and operates substantially like the body of cement in a new joint.

We claim as novel the joint herein described, using an elastic rather than simply a plastic cementing material, and the method of making it, together with the method of repairing broken pipe or joints. Various elastic and rubber cements are available and by the term "elastic cement" it will be understood that we wish to mean a cement which may be applied while in a viscous or semi-fluid condition and which will dry or harden to produce an elastic and rubber-like body adhering to the adjacent surfaces to which it has been subjected when in a viscous condition.

It will be understood that whereas we have described and shown a practical and operative embodiment of our joint and of our method of repairing pipe, many changes may be made in the size, shape, number and disposition of parts and in the steps of the method. Our description and drawing are, therefore, to be taken as in a broad sense illustrative and diagrammatic rather than as limiting us to our precise showing.

Our invention is particularly adaptable for application to butt joints or joints where sections of pipe abut against each other without the employment of laterally offset gripping or securing channels or indentations. In other words, it is the surface adhesion between a mass of rubber cement or its equivalent and the opposed faces of abutting pipe members which forms the joint herein described and claimed.

We claim:

A pipe joint which includes opposed substantially plane pipe ends, generally perpendicular to longitudinal axis of the pipe, and a mass of rubber cement positioned in the space between and adhering to the opposed surfaces of the pipe ends with sufficient strength to prevent breakage of the bond due to relative movement of the pipe ends caused by contraction or expansion of the pipe due to temperature changes, said material lying normally within the space defined by inner and outer walls of the adjacent pipes and being in sufficient bulk to allow the elasticity of the mass to prevent destruction of the adhesion between the mass and the adjacent pipe members in response to relative movement of adjacent pipe members.

MORRIS C. ALLEN.
RAY G. SHELLEY.